Jan. 24, 1939.  I. JEPPSSON  2,144,733

MOTOR CONTROL MECHANISM

Filed June 3, 1935   3 Sheets-Sheet 1

Inventor:
Ivar Jeppsson
By Wilson, Dowell,
McCanna & Wintercorn
Attys.

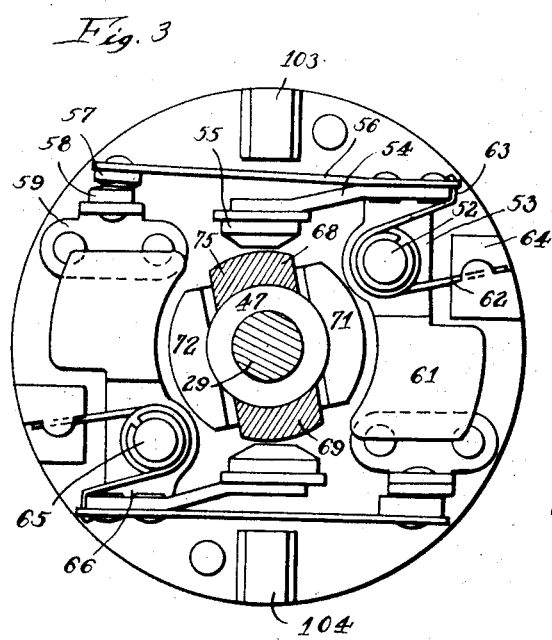
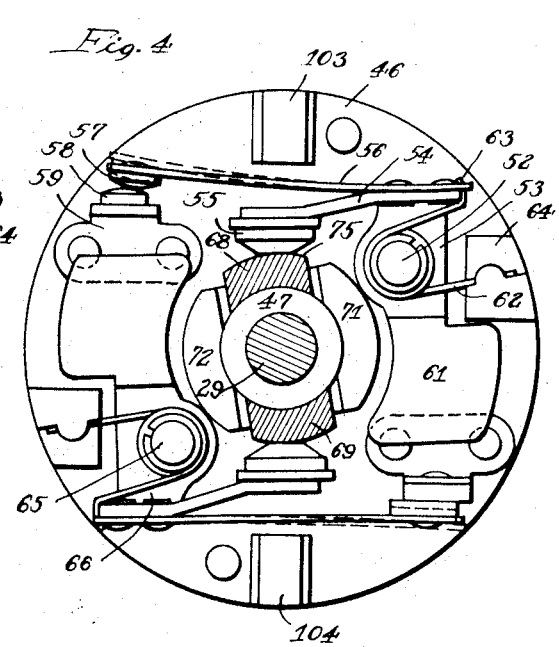
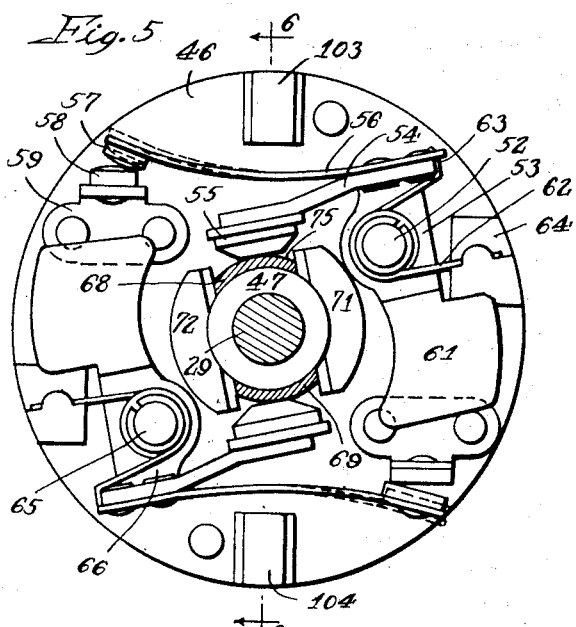
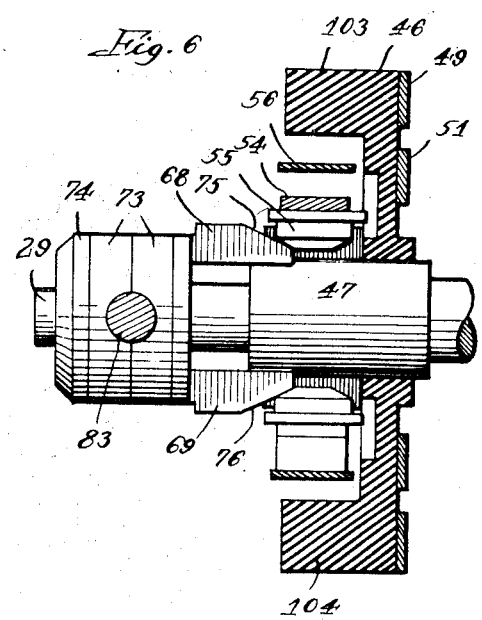
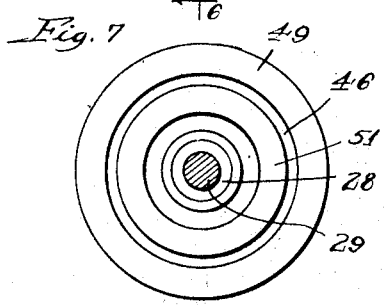

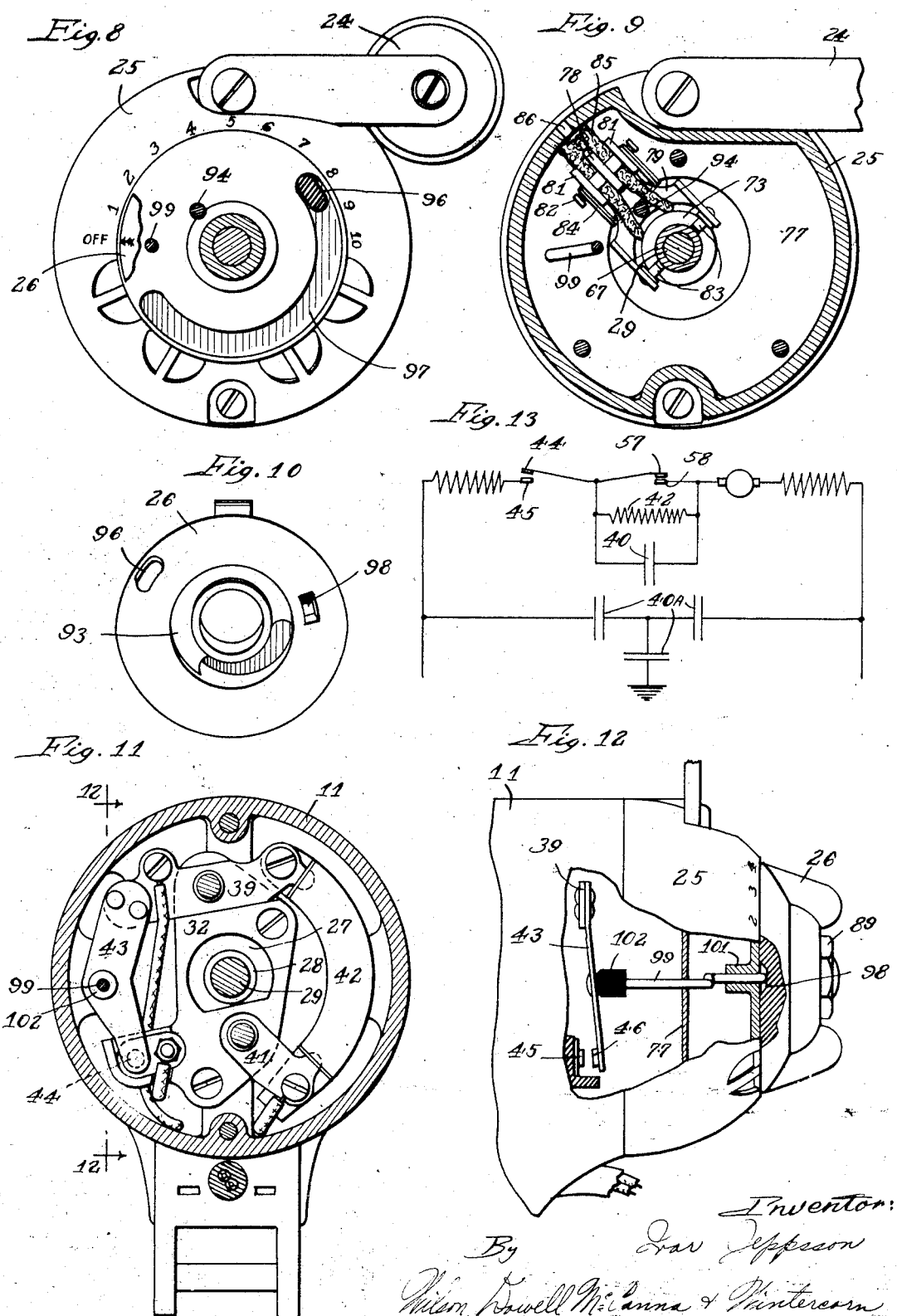

Patented Jan. 24, 1939

2,144,733

UNITED STATES PATENT OFFICE 2,144,733

MOTOR CONTROL MECHANISM

Ivar Jeppsson, Chicago, Ill., assignor to Chicago Flexible Shaft Company, Chicago, Ill., a corporation of Illinois Application June 3, 1935, Serial No. 24,700

17 Claims. (Cl. 200—80)

This invention relates to control mechanism for electric motors particularly adapted for household mixers, and contemplates as one of the objects the provision of generally improved control mechanism and improved means for regulating the same.

Another object of the invention is the provision of improved means for rendering the control mechanism variable.

A still further object of the invention is the provision of control mechanism wherein contacts are carried on the rotatable part, and means are provided for varying the controlled speed while the control mechanism is in operation.

I have also aimed to provide a control mechanism so constructed that the normal wear occasioned by operation of the device in no wise affects the speed settings of the device so that the same will retain its original setting.

Other objects and attendant advantages will become apparent from the following description and the accompanying drawings, in which—

Figs. 3, 4 and 5 are sections on the line 3—3 of Fig. 2, showing moved positions of the weight members;

Fig. 6 is a section on the line 6—6 of Fig. 5 showing the parts in a position corresponding to that of Fig. 5;

Fig. 7 is a view of the rotatable member showing the face opposite that shown in Figs. 3-5;

Fig. 8 is a section on the line 8—8 of Fig. 2;

Fig. 9 is a section on the line 9—9 of Fig. 2;

Fig. 10 is a view of the cam face of the actuating knob;

Fig. 11 is a section on the line 11—11 of Fig. 2;

Fig. 12 is a view of the back end of the motor unit showing the casing broken away along the line 12—12 of Fig. 11, and Fig. 13 is a wiring diagram of the mixer embodying this invention.

Figure 1:
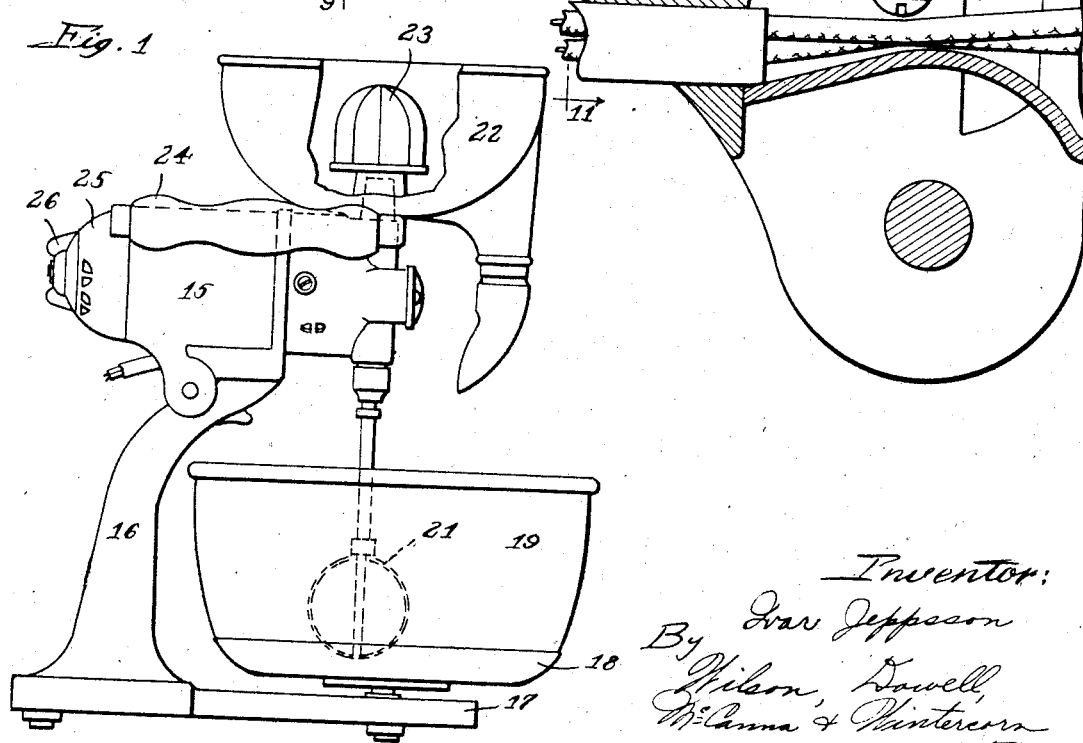
Figure 1 is a side elevation of a household mixer embodying my invention.

The control mechanism is of particular merit in connection with the conventional type of household mixer such as shown in Figure 1 wherein the numeral 15 designates a motor mixer unit supported on a pedestal carried in turn on a base 17, the base having a rotatable platform 18 for supporting a mixer bowl 19 into which the beaters 21 project. The motor unit carries a juicer bowl 22 having a cone 23 driven from the motor unit. A handle 24 serves for the portable use of the motor unit. A casing 25 is attached to the rear end of the motor unit 15 and carries a knob 26 for the purpose of setting the motor speed.

Figure 2:
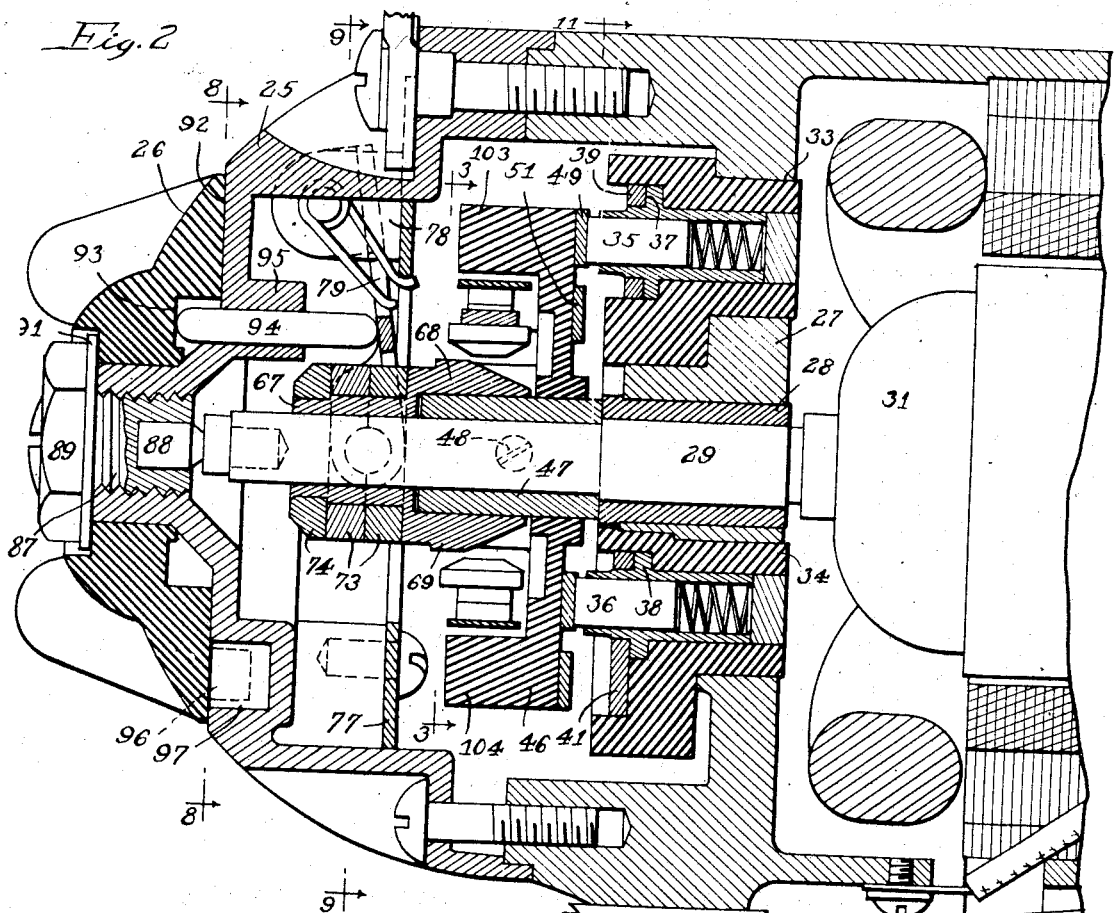
Fig. 2 is a vertical section through the back end of a household mixer motor unit showing the parts of the control mechanism principally in section and one manner of its application to the mixer.

Directing attention now to Fig. 2, the motor casing 15 has a partition 27 which carries a sleeve 28 supporting the shaft 29 of the motor designated generally by the numeral 31. A brush carrier designated generally by the numeral 32 of insulation, preferably formed of molded plastic, such as "bakelite", is positioned against the back side of the partition 27 and has bosses 33 and 34 projecting into the partition as shown in Fig. 2, brushes 35 and 36 being carried in the bores of the bosses 33 and 34 and being spring pressed toward the rear. The brushes 35 and 36 are surrounded by metallic sleeves 37 and 38 held in position by conductors 39 and 41. A resistor 42 and a condenser 40 (Fig. 13) are connected between the conductors 39 and 41 as shown in Fig. 11, and the conductor 39 carries a spring strip 43 of conducting material having a contact 44 adapted to cooperate with a contact 45 on the brush carrier 32 providing a master switch for turning the current to the motor on and off. Suitable electrical connections, including filter condensers 40A (Fig. 13), as will be apparent from the wiring diagram, serve to supply current to the brush carrier.

A rotatable member comprising a disk 46 is positioned on the shaft 29 rearwardly of the brush carrier, the disk being of insulating material and being supported on the shaft through a bearing sleeve 47 attached to the shaft by means of a set screw 48 so that the sleeve and rotatable member rotate with the shaft. Brass rings 49 and 51 are attached to the inner face of the disk in positions to cooperate with the brushes 35 and 36 to conduct electrical energy to contacts presently to be described. Referring now to Figs. 3-5, inclusive, the outward or rearward side of the disk 46 carries a pin 52 which projects through the disk making electrical contact with the ring 51. This pin pivotally carries a weighted arm 53 for rotation with the disk and for rotation about the pin 52 with respect to the disk. This pin it will be noted is eccentric with respect to the axis of the disk. One end of the arm 53 carries a finger 54 fixedly attached thereto at one end and having a button 55 at its opposite end positioned to move toward and away from the axis of the disk upon rotation of the arm 53 about the pin 52. A leaf spring 56 is attached at one end to the same end of the arm 53 and projects along the face of the disk tangentially with respect to the direction of rotation thereof and at its free end carries a contact 57 positioned to engage a stationary contact 58 attached to the disk by means of a bracket 59 electrically connected to the collector ring 49 on the opposite face of the disk whereby the electrical circuit between the collector rings 49 and 51 is opened and closed by the opening and closing of the contacts 57 and 58. The opposite end of the arm 53 is in this instance enlarged, as shown at 61, and weighted if necessary so that the resultant of all centrifugal force acting upon the lever pivoted on the pin 52 is to cause the pivoted parts to rotate in a counterclockwise direction on the pin 52 when the rotatable member is in rotation. A spring 62 is coiled about the pin 52, one end 63 thereof engaging the lever and the opposite end thereof being anchored in a projection 64 on the disk, acts to urge the lever in a counterclockwise direction so as to normally maintain the contacts 57 and 58 closed. A pin 65 of the same diameter of the disk as the pin 52 but on the opposite side of the axis thereof carries lever mechanism 66 similar in all material respects to the parts marked 53—63, respectively, but which parts have no electrical connection with the collector rings, the parts being merely counterbalancing parts for those previously described but being made on the same pattern and of the same weights so as to counterbalance the action of the make and break mechanism in any of its moved positions.

A sleeve 67 is carried on the shaft 29 and has a pair of forwardly extending fingers 68 and 69 overriding the sleeve 47, the disk 46 having forwardly extending segments 71 and 72 adapted to bear against opposite sides of the fingers, as best shown in Figs. 3–5. In this instance the sleeve carries a pair of rings 73 of oilless bearing material retained in place by means of a collar 74, the rings 73 being engaged by means presently to be described for moving the sleeve 67 longitudinally of the shaft. The forward ends of the fingers 68 and 69 have cam surfaces 75 and 76 adapted to be engaged by the buttons 55, as shown in Fig. 6 for the purpose of limiting the degree of rotation of the arm 53 under centrifugal action, as will presently be described.

The casing 25 is bolted to the motor casing and carries on its inner recess a plate 77 having an upstanding ear 78 on its rear face. A bifurcated lever designated generally by the numeral 79 has a pair of ears 81 which act to carry the lever on the ear 78 by means of a pin 82. The opposite bifurcated end of the lever 79 carries pins 83 engaging the rings 73 on opposite sides of the bushing 67 so that movement of the lever 79 about the pin 82 brings about longitudinal movement of the sleeve 67 on the shaft 29 to regulate the position at which the button 55 will engage the cam surface 75. A spring 84 acts in such manner as to urge the sleeve 67 to the right facing Fig. 2, or in other words, so as to cause the button to engage the cam at its highest point. A wick 85 registers with an oil hole 86 to distribute lubricant to the ring 73.

The casing 25 also carries a threaded insert 87 which carries an end thrust bearing 88 for the end of the shaft 29 adjustable by means of a nut 89. The nut 89 also retains in position a washer 91 which bears against the knob 26, as shown in Fig. 2, to retain the same in surface contact with the casing 25 as shown at 92.

The knob 26 has a slot 93 positioned to receive a pin 94 having sliding reception in a boss 95 of the casing 25 and adapted at one end to engage the lever 79, whereby upon rotation of the knob 26 the pin 74 is caused to move longitudinally against the action of the spring 84 to bring about longitudinal movement of the sleeve 67 and the cam fingers 68 and 69, whereby to regulate the speed of the motor. The knob also carries a projection 96 received in an arcuate recess 97 on the casing 25, the projection and recess acting as stops for the knob to limit the degree of rotation thereof. The knob 26 also has a recess 98 adapted to receive the end of a pin 99 carried in a boss 101 in the casing 25 and passing through the plate 77 to allow the opening of the switch lever 43 against which the end of the pin 99 bears, the lever 43 being spring tensioned to move to its open position as shown in Fig. 12. Insulation 102 is positioned on the end of the pin 99 for obvious reasons.

The casing 25 is preferably provided with proper indicia as shown in Fig. 8 for indicating the positions of the dial. The recess 98 is so positioned that the pin 99 is received therein when the dial indicates the off position. When the knob is rotated out of this position, the switch lever 43 closes the contacts 44 and 45, whereupon the motor starts. When the knob is turned to the point indicated as 1 on the dial, the parts come into the position shown in Figs. 2 and 3, the rotatable member rotates with the motor. As the motor picks up speed, the arm 53 rotates in a counterclockwise direction facing Fig. 3 about the pin 52 until the button 55 engages the cam surface 75. During this increase in speed the contact 57 is being urged or drawn away from the contact 58 by centrifugal force, but as it tends to move, the centrifugal force acting to move the lever maintains the contacts closed. However, when the button 55 engages the cam surface 75 as shown in Fig. 4, the centrifugal force acting on the contact 57 and the tension of the spring 56 come into equilibrium so that upon any increase in speed of the motor, the contact 57 moves away from the contact 58 opening the switch. The speed of the motor then decreases and the switch is again closed because of the decrease in the centrifugal force acting on the contact 57. Thus, so long as the knob occupies the position indicated by the numeral 1 on the dial, this action will be repeated, maintaining the selected motor speed, within the capacity of the motor. It will be seen that the contacts 57 and 58 will remain closed a greater or lesser proportion of the time dependent upon the load upon the motor. It will also be observed that any sudden changes in the speed of the motor brings about very rapid action of the control mechanism. For example, upon a rapid or sudden increase of motor speed such as might be brought about by a quick release of the load on the mixer beaters, the inertia of the contact point 57 will cause it to lag behind the motion of the stationary contact and thus instantly open the contacts. This is augmented by the inertia of the weighted portion 61 of the lever 63, the inertia of which tends to cause rotation about the pin 52 and consequent opening of the contacts. Likewise, a sudden decrease in the motor speed causes the contacts to be instantly closed because of the inertia of the contact point 57 which is free to continue its travel at its previous high rate of speed until it engages the contact 58. As the knob 26 is moved up along the dial, the cam fingers 68 and 69 are drawn to the left facing Figs. 2 and 6, thus allowing the lever 53 to rotate about the pin 52 to a greater and greater degree, thus compensating for the increased impulse on the part of the contact 57 to leave the contact 58 and open the circuit.

When the control is placed in the position to give the highest motor speed, the parts occupy the position shown in Figs. 5 and 6 at which the button 55 engages the cam surface 75 adjacent its lowermost point. With this setting it will be seen that as the motor comes up to speed, the arm 53 rotates about the pin 52 compensating for the opening impulse of the contact 57 until the button 55 engages the cam surface 75. At this point the spring 56 and the contact 57 function in the same manner as in the position shown in Fig. 4, but permit the motor to attain a higher speed before the contacts begin to open and close under the small regulating changes of speed. Abutments 103 and 104 are formed on the disk 46 for the purpose of limiting the outward movement of the contact 57 should anything go wrong with the control mechanism, so that the contact and spring cannot strike some stationary part of the device and further damage the mechanism.

Attention is directed to the positive action of the setting mechanism and the fact that the construction permits the wear between the stationary and moving parts to be taken on a relatively broad bearing surface so as to eliminate the possibility of adjustments changing because of wear. Further, the outer surface of the main body of the sleeve 68 determines the lower speed of the contacts and that the button 55 has a broad area of contact therewith. This coupled with the fact that there is no relative rotary motion between these parts assures that there will be no change in the setting over a long period of use.

A further advantage in the construction lies in the fact that once the motor has attained its selected speed the contacts are opened and closed by the mere flexing of the spring 65 and that the opening pressure is uniform at all speeds which results in a very sensitive control. This is augmented by the combined centrifugal and inertia action of the control device.

Another advantage is that the structure permits or provides a rigid assembly carried substantially entirely on the shaft of the motor, which passes through the disk and has bearing support at the rear of the housing.

While I have thus described and illustrated a specific embodiment of the invention, I am aware that numerous alterations and changes may be made therein within the spirit of the invention. and I do not wish to be limited except as required by the prior art and the scope of the appended claims, in which, I claim:

1. The combination in a motor of make and break mechanism comprising a rotatable member, a pair of electrical contacts carried thereon for controlling the supply of current to the motor, a pair of pivotally supported unequal interconnected weight members on said rotatable member for controlling one contact normally operative to maintain said contacts closed, and means to regulate the range of effectiveness of one weight member for opening said contacts under the action of the other weight member.

2. The combination in a motor having a shaft, of a rotatable member on said shaft, opposed contacts on said rotatable member, a leaf spring supporting one of said contacts, said spring being positioned to flex under changes in speed of said rotatable member to open and close said contacts, and means movable longitudinally on the axis of rotation of said rotatable member during the rotation thereof for moving the support for said spring to compensate for predetermined amounts of flexing of said spring whereby to select different contact opening speeds.

3. The combination in a motor having a shaft, of a rotatable member on said shaft, opposed contacts on said rotatable member, a leaf spring supporting one of said contacts positioned to flex under changes in speed of said rotatable member to open and close said contacts, pivotal means for supporting said spring on said rotatable member, and automatic means responsive to the speed of said rotatable member to rotate said support to prevent opening of said contacts during predetermined amounts of flexure of said spring to select different contact opening speeds.

4. The combination in a motor having a shaft, of a rotatable member on said shaft, opposed contacts carried on said rotatable member, a leaf spring supporting one of said contacts positioned to flex under changes in speed to open and close said contacts, pivotal means for supporting said spring on said rotatable member, centrifugally operated weight means for rotating said support to prevent opening of said contacts by flexure of said spring, and manually variable means to limit the rotation of said support to select different contact opening speeds.

5. The combination recited in claim 4 wherein said spring supported contact comprises a weight member movable away from the opposed contact upon increase of speed of said rotatable member, and the centrifugally operated weight member is positioned to move the support and the spring supported contact toward the opposed contact upon decrease in speed of said rotatable member whereby rapid opening and closing of said contacts result from such inertia movements.

6. A circuit maker and breaker comprising in combination a rotatable member, a stationary contact carried on said member, a movable contact carried on said member having a moving impulse toward and away from the stationary contact under the influence of speed changes of the member, compensating means for said movable contact operable to prevent movement of the movable contact under said impulse to normally maintain said contacts closed, and means for rendering said compensating means operative over a greater or lesser portion of the speed range of said rotatable member.

7. A circuit maker and breaker comprising in combination a rotatable member, a stationary contact carried on said member, a movable contact carried on said member having a moving impulse toward and away from the stationary contact under the influence of speed changes of the member, supporting means for said movable contact normally movable under centrifugal force to prevent movement of the movable contact under said moving impulse upon increase of speed, and means for predetermining the degree of movement of said supporting means to predetermine the speed of rotation at which said contacts are opened.

8. A circuit maker and breaker comprising in combination a rotatable member, a stationary contact carried on said member, a movable contact having a moving impulse toward and away from the stationary contact under the influence of speed changes of the member, supporting means for said contact rotatable under the influence of speed changes of said member to prevent movement of said contact under said moving impulse, and means to predetermine the degree of said rotation to predetermine the speed at which said contacts are opened.

9. A circuit maker and breaker comprising in combination a rotatable member, a stationary contact carried on said member, a movable contact, resilient means supporting the movable contact on said member for movement away from the stationary contact upon increase of speed, centrifugal means for moving said resilient means to maintain the contacts closed upon increase of speed, and means for limiting the movement of said centrifugal means to predetermine the opening speed of said contacts.

10. A circuit maker and breaker comprising in combination a rotatable member, opposed contacts carried on said member, a leaf spring supporting one of said contacts for movement under the influence of speed changes, a centrifugal member pivotally carried on said rotatable member and supporting said spring for movement to compensate for movement of the contact carried thereby, and manually operable means for limiting the movement of the centrifugal member to predetermine the opening speed of said contacts.

11. A circuit maker and breaker comprising in combination a rotatable disk, a stationary contact point carried on the disk, a movable contact point, resilient means on said disk for carrying the movable contact and for normally maintaining said contacts closed, said means being tiltable with respect to the disk under centrifugal action to maintain said contact points closed with increase in speed of rotation of the disk, and manually operable means adjustable to limit the tilting of said resilient means at predetermined speeds to control the opening speed of said contacts.

12. A circuit maker and breaker comprising in combination a rotatable member, a stationary contact carried on said member, a movable contact, a spring member for carrying said contact and for normally maintaining said contacts closed on said member, said spring member being tiltable with respect to said rotatable member in response to speed changes of said member during rotation of said member in a direction to oppose opening of said contacts, and means operative during the rotation of said member to limit the tilt of said spring member to any of a plurality of predetermined angularities to regulate the opening speed of said contacts.

13. The combination in a make and break mechanism of a rotatable member, a stationary contact carried thereby, a weight member pivotally supported on said rotatable member on a center offset from the axis of rotation thereof and for rotation with respect to said rotatable member under the influence of speed changes in the latter, a movable contact resiliently carried on said weight member for closing a circuit with said stationary contact to control the speed of said rotatable member, stop means on said weight member movable toward and away from the axis of rotation of said rotatable member upon rotation of said weight member, and means manually movable on the axis of rotation of said rotatable member for engagement by said stop means to predetermine the degree of rotation of said weight means to predetermine the opening speed of said contacts.

14. A rotatable make and break mechanism comprising a shaft, a balanced member positioned on the shaft, rotatable therewith, and having a sleeve bearing thereon for longitudinal movement to adjust said make and break mechanism to predetermine the speed of the shaft, a stationary sleeve member coaxial with the shaft having thrust bearing against said balanced member, and means for manually moving said stationary member to impart longitudinal movement to said balanced member.

15. A rotatable make and break mechanism comprising a shaft, a balanced member positioned on the shaft, rotatable therewith, and having a sleeve bearing thereon for longitudinal movement to adjust said make and break mechanism to predetermine the speed of the shaft, a normally stationary sleeve member coaxial with the shaft having thrust bearing against said balanced member, and manually operated cam means for moving said normally stationary member to impart longitudinal movement to said balanced member.

16. A rotatable make and break mechanism comprising a shaft, a balanced member positioned on the shaft, rotatable therewith, and having a sleeve bearing thereon for longitudinal movement to adjust said make and break mechanism to predetermine the speed of the shaft, a stationary sleeve member coaxial with the shaft having thrust bearing against said balanced member, means for manually moving said stationary member to impart longitudinal movement to said balanced member, and switch means for said motor positioned to be actuated upon movement of said normally stationary member substantially to one end of its movement.

17. A rotatable centrifugal make and break mechanism comprising a shaft, a balanced member carried on and concentric with said shaft and movable longitudinally thereof, said member having portions forming stops to predetermine the contact opening speed of said make and break mechanism, a sleeve member coaxial with said shaft having annular thrust bearing against said balanced member, and cam means for manually moving said sleeve member to predetermine the position of said stop portions and thereby predetermine the speed of said shaft.

IVAR JEPPSSON.